United States Patent
Inoue et al.

(10) Patent No.: US 9,187,354 B2
(45) Date of Patent: Nov. 17, 2015

(54) METHOD FOR INHIBITING SCALE AND GEOTHERMAL POWER GENERATING DEVICE

(75) Inventors: Kohei Inoue, Kanagawa (JP); Shinya Ui, Tokyo (JP); Yoshitaka Kawahara, Yokohama (JP); Ichiro Myougan, Yokohama (JP); Yasuyuki Hishi, Takizawa (JP); Daisuke Fukuda, Morioka (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 105 days.

(21) Appl. No.: 14/240,339

(22) PCT Filed: Aug. 24, 2012

(86) PCT No.: PCT/JP2012/071419
§ 371 (c)(1),
(2), (4) Date: Feb. 21, 2014

(87) PCT Pub. No.: WO2013/027822
PCT Pub. Date: Feb. 28, 2013

(65) Prior Publication Data
US 2014/0165564 A1    Jun. 19, 2014

(30) Foreign Application Priority Data
Aug. 25, 2011    (JP) .................. 2011-183943

(51) Int. Cl.
*F01K 27/00*    (2006.01)
*C02F 5/08*    (2006.01)
(Continued)

(52) U.S. Cl.
CPC ... *C02F 5/08* (2013.01); *F03G 7/04* (2013.01); *C02F 2103/06* (2013.01); *C02F 2209/02* (2013.01); *C02F 2209/03* (2013.01); *C02F 2209/06* (2013.01); *Y02E 10/10* (2013.01)

(58) Field of Classification Search
CPC ............ C02F 2103/06; C02F 2209/02; C02F 2209/03; C02F 2209/06; C02F 5/08; F03G 7/04; Y02E 10/10
See application file for complete search history.

(56) References Cited

U.S. PATENT DOCUMENTS

| 4,500,434 A | 2/1985 | Jost et al. |
| 5,656,172 A | 8/1997 | Kitz et al. |

(Continued)

FOREIGN PATENT DOCUMENTS

| EP | 033557 A1 | 8/1981 |
| JP | 56-121694 A | 9/1981 |

(Continued)

OTHER PUBLICATIONS

Icelandic Search Report dated Sep. 5, 2014 in counterpart Icelandic Application No. 050075.
(Continued)

*Primary Examiner* — Jesse Bogue
(74) *Attorney, Agent, or Firm* — Holtz, Holtz, Goodman & Chick PC (57) ABSTRACT

A scale inhibition method for injecting an alkaline agent and a chelating agent into a fluid containing at least silica and calcium ions, and inhibiting generation of scale, includes feeding the chelating agent and the alkaline agent into piping channeling the fluid, mixing the fluid while causing the fluid to flow in a chemical-mixing part provided in the piping, and when either a pressure difference between the pressures or a flow rate difference between the rates of fluid flow at an inlet and an outlet of the chemical-mixing part exceeds a preset upper threshold, increasing the amount of the chelating agent fed, and feeding the chelating agent at an increased feed amount until the pressure difference or flow rate difference falls below a preset lower threshold.

11 Claims, 8 Drawing Sheets

(51) Int. Cl.
*F03G 7/04* (2006.01)
*C02F 103/06* (2006.01)

(56) References Cited

U.S. PATENT DOCUMENTS

| | | | |
|---|---|---|---|
| 5,858,245 A | 1/1999 | Gallup | |
| 5,965,031 A | 10/1999 | Kitz et al. | |
| 2003/0004081 A1 | 1/2003 | Ellis et al. | |
| 2005/0000894 A1* | 1/2005 | Hedstrom et al. | 210/636 |
| 2008/0149562 A1* | 6/2008 | Tarr et al. | 210/637 |
| 2011/0114564 A1 | 5/2011 | Zuhl et al. | |
| 2012/0228221 A1* | 9/2012 | Kakigami et al. | 210/636 |
| 2013/0001163 A1* | 1/2013 | Taniguchi et al. | 210/637 |
| 2015/0121867 A1* | 5/2015 | Kubota et al. | 60/641.2 |

FOREIGN PATENT DOCUMENTS

| | | |
|---|---|---|
| JP | 59-130597 A | 7/1984 |
| JP | 63-039700 A | 2/1988 |
| JP | 09-264507 A | 10/1997 |
| JP | 09-294973 A | 11/1997 |
| JP | 2008-170112 A | 7/2008 |
| WO | 2010005889 A1 | 1/2010 |

OTHER PUBLICATIONS

Fukuda, Daisuke, Geothermal Energy Technology, vol. 34, Nos. 1&2 (Ser. No. 74) 51-57, 2009.

International Search Report (ISR) dated Oct. 9, 2012 issued in International Application No. PCT/JP2012/071419.

* cited by examiner

METHOD FOR INHIBITING SCALE AND GEOTHERMAL POWER GENERATING DEVICE

TECHNICAL FIELD

The present invention relates to a method for inhibiting scale containing calcium and/or silica, and a geothermal power generation device for inhibiting deposition of such scale and generating power using geothermal water.

BACKGROUND ART

In geothermal power generation, high-temperature geothermal water is collected from a production well, and power is generated using steam separated from the geothermal water. The geothermal water from which steam has been separated is returned into the ground from an reinjection well.

Geothermal water collected from a production well contains more calcium ions and dissolved silica than well water or river water. Therefore, deposition of scale comprising calcium carbonate or amorphous silica readily occurs. In particular, in an above-ground section or in an reinjection well, inhibition of silica scale generated by a decrease in temperature of geothermal water at the above-ground section is a problem to be addressed.

Sulfuric acid injection is generally used to inhibit silica scale. Sulfuric acid injection is a method in which the pH of geothermal water is lowered, whereby the speed of polymerization of silica is reduced and the speed of silica scale deposition is decreased.

However, lowering the pH of geothermal water merely lowers the speed of polymerization of silica. Therefore, in instances in which time is required to return the geothermal water to the reinjection well, deposition of silica scale is not necessarily inhibited to a sufficient extent. In addition, there was a risk of piping or other elements corroding due to the acid. In addition, in instances in which sulfuric acid is used as the acid, there was a risk of deposition of anhydrite or other scale.

Non-patent document 1 discloses injecting a chelating agent into the production well, injecting an alkaline agent in the above-ground section, and inhibiting scale deposition. The solubility of amorphous silica is said to increase with increasing pH value, and to rapidly rise in particular at pH8 or above. Therefore, increasing the pH of geothermal water makes it possible to inhibit silica scale deposition. In contrast to the above method in which the speed of silica polymerization is inhibited, the total amount of silica deposition does not increase with passage of time; therefore, this effect is maintained even in the reinjection well. In addition, additionally using a chelating agent for chelating calcium or magnesium in the production well makes it possible to inhibit deposition of calcium carbonate, anhydrite, and magnesium silicate in the production well.

PRIOR ART DOCUMENTS

Non-Patent Documents

[Non-Patent Document 1] FUKUDA, Daisuke, Geothermal Energy Technology, Vol. 34, Nos. 1&2 (Ser. No74) 51-57, 2009

DISCLOSURE OF THE INVENTION

Problems to be Solved by the Invention

However, a problem is presented in that in geothermal water having a relatively high concentration of calcium ion or dissolved silica, increasing the pH and making the water alkaline results in calcium ions and silica forming a salt and calcium silicate hydrate is deposited. In particular, in the vicinity of the alkaline agent inlet, the pH is locally higher, and the calcium silicate hydrate is more readily deposited out.

Accordingly, the purpose of the present invention is to provide a method for inhibiting scale including calcium and/or silica, and a geothermal power generation device that can be operated in an economic manner while inhibiting deposition of such scale.

Means to Solve the Problems

Upon performing a variety of investigation regarding the solubility characteristics of calcium silicate hydrate, the inventors of the present invention discovered that increasing the concentration of a chelating agent makes it possible to clean, by dissolution, the deposited calcium silicate hydrate.

Specifically, the scale inhibition method according to the present invention is a scale inhibition method for injecting an alkaline agent and a chelating agent into a fluid containing at least silica and calcium ions and inhibiting generation of scale, the scale inhibition method including: feeding the chelating agent and the alkaline agent into piping channeling the fluid; mixing the fluid while causing the fluid to flow in a chemical-mixing part provided in the piping; and when a pressure difference between the pressures at an inlet and an outlet of the chemical-mixing part, or a flow rate difference between the rates of fluid flow at an inlet side and an outlet side of the chemical-mixing part, exceeds a preset upper threshold, increasing the amount of the chelating agent fed, and feeding the chelating agent at an increased feed amount until the pressure difference or the flow rate difference falls below a preset lower threshold.

According to the scale inhibition method of the present invention, injecting an alkaline agent and a chelating agent into a fluid containing at least silica and calcium ions results in the alkaline agent inhibiting deposition of silica-based scale, and the chelating agent capturing the calcium ions and inhibiting deposition of calcium-based scale. Injecting the alkaline agent into the fluid may result in deposition of calcium silicate hydrate in the vicinity of the inlet for the alkaline agent. However, when the pressure difference between the pressures at the inlet and the outlet of the chemical-mixing part, or a flow rate difference between the rates of fluid flow at the inlet side and the outlet side of the chemical-mixing part, exceeds a preset upper threshold, the amount of the chelating agent fed is increased, and the chelating agent is fed at an increased feed amount until the pressure difference or the flow rate difference falls below a preset lower threshold; therefore, the deposited calcium silicate hydrate is cleaned by dissolution by the chelating agent. In addition, although chelating agents are relatively costly chemicals, since the amount of the chelating agent fed is intermittently increased only when the amount of calcium silicate hydrate deposition has heightened and a need for the scale to be cleaned by dissolution has been generated, the scale including silica and calcium can be inhibited using the minimum amount of chelating agent necessary, making the arrangement economical.

In the scale inhibition method of the present invention, it is preferable that the alkaline agent be fed to the fluid at the same time as or after the feeding of the chelating agent. This configuration inhibits deposition of calcium silicate hydrate and the like, and makes it possible to further reduce the amount of chelating agent used.

In the scale inhibition method of the present invention, it is preferable that the chemical-mixing part be a static mixer. A static mixer is an inline-type mixer for mixing a fluid through the three actions of flow division, flow inversion, and flow conversion, using the energy of the fluid. A static mixer does not need to be powered, making it possible to reduce operation cost.

In the scale inhibition method of the present invention, it is preferable that the method include:

a step in which the fluid is geothermal water collected from a production well, and geothermal heat is collected from the geothermal water using a geothermal heat recovery apparatus;

the amount of the alkaline agent fed is set so as to obtain a pH value at which the saturation of amorphous silica at the temperature of the geothermal water that has passed through the geothermal heat recovery apparatus is equal to or greater than the concentration of silica in the geothermal water; and the amount of the chelating agent fed is set so that the concentration of calcium ions that have not been captured by the chelating agent in the geothermal water on the downstream side of the chemical-mixing part is less than the saturation concentration of calcium silicate hydrate at the temperature of the geothermal water that has passed through the geothermal heat recovery apparatus. Setting as described the amounts of the alkaline agent and the chelating agent fed inhibits scale deposition.

In the scale inhibition method of the present invention, it is preferable that the alkaline agent and/or the chelating agent be diluted in advance using a dilution solvent and fed to the fluid. Although feeding a high-concentration chemical to the fluid may cause scale to be deposited out more readily in the vicinity of the inlet, diluting the chemical in advance makes it possible to effectively prevent scale deposition in the vicinity of the inlet.

A geothermal power generation device according to the present invention includes:

piping channeling geothermal water collected from a production well;

a chelating agent feed unit for feeding a chelating agent to the geothermal water flowing through the piping;

an alkaline agent feed unit for feeding an alkaline agent to the geothermal water flowing through the piping;

a chemical-mixing part provided, on the piping route, downstream from the chelating agent feed unit and the alkaline agent feed unit;

a first detector for measuring the pressure at an inlet, or the rate of fluid flow at an inlet side, of the chemical-mixing part; and a second detector for measuring the pressure at the outlet, or the rate of fluid flow at an outlet side, of the chemical-mixing part;

the chelating agent feed unit being controlled so that when the difference between a detection value by the first detector and a detection value by the second detector exceeds a preset upper threshold, the amount of the chelating agent fed is increased, and the chelating agent is fed at an increased feed amount until the difference between the detection values falls below a preset lower threshold.

According to the geothermal power generation device of the present invention, the chelating agent feed unit is controlled so that when the difference between a detection value by the first detector and a detection value by the second detector exceeds a preset upper threshold, the amount of the chelating agent fed is increased, and the chelating agent is fed at an increased feed amount until the difference between the detection values falls below a preset lower threshold; therefore, it is possible to increase the amount of the chelating agent fed and clean the calcium silicate hydrate by dissolution only when the amount of calcium silicate hydrate deposition has heightened and a need for the scale to be cleaned by dissolution has been generated. Therefore, it is possible to reduce the amount of the chelating agent used to the minimum necessary while inhibiting scale deposition, and operate the power generation device in an economic manner.

Advantageous Effects of the Invention

According to the scale inhibition method of the present invention, it is possible to reduce the amount of the chelating agent used to the minimum necessary while inhibiting scale deposition.

In addition, according to the geothermal power generation device of the present invention, it is possible to reduce the amount of chelating agent used to the minimum necessary while inhibiting scale deposition in piping and various apparatuses through which the geothermal water is channeled, making it possible to operate the power generation device in an economic manner.

BEST MODE FOR CARRYING OUT THE INVENTION

An embodiment of the scale inhibition method according to the present invention will now be described with reference to the drawings.

First Embodiment

Figure 1:
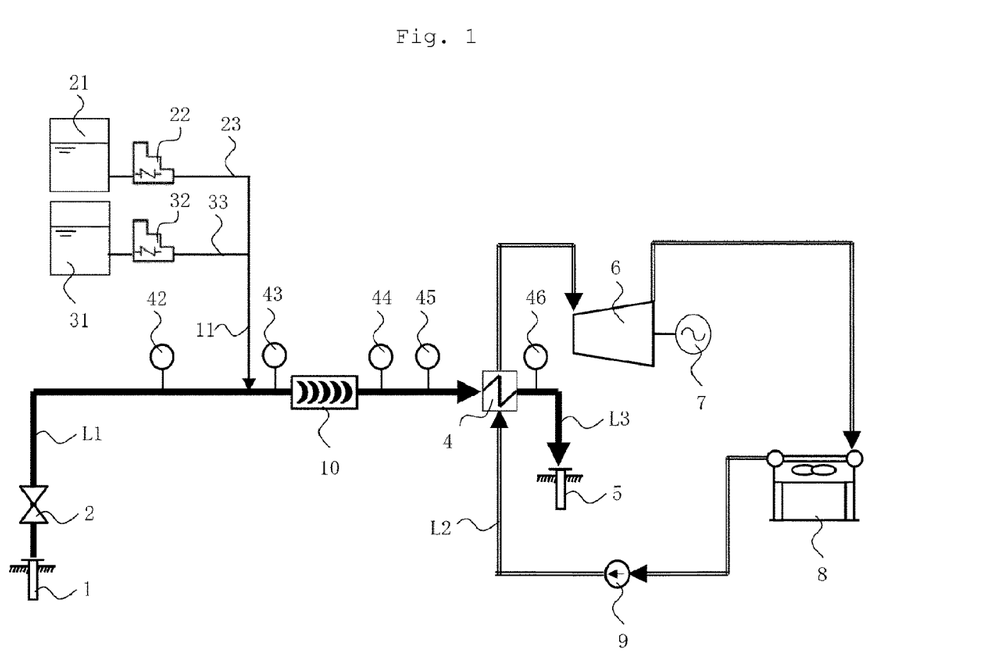
FIG. 1 is a schematic view of a first embodiment of a geothermal power generation device to which the scale inhibition method of the present invention is applied.

FIG. 1 is a schematic view of a first embodiment of a geothermal power generation device to which the scale inhibition method of the present invention is applied.

In the drawing, numeral 1 indicates a production well for extracting geothermal water from the ground. One end of piping L1 is connected via a flow control valve 2 to the production well 1. In the present embodiment, the "geothermal water" corresponds to the "fluid containing at least silica and calcium ions" in the present invention. Although the properties of the geothermal water vary according to the location of collection, an example is a temperature of 130° C., a pH of 9, a calcium ion concentration of 10 mg/L, a dissolved silica concentration of 600 mg/L; the geothermal water also contains a large variety of ions such as chloride ions, sulphate ions, and sodium ions.

A calcium ion concentration meter 42, a first pressure meter 43, a static mixer 10, a second pressure meter 44, and a pH meter 45 are installed on the piping L1, and the piping L1 connects to a heat exchanger (evaporator) 4. In the present invention, the "first pressure meter 43" corresponds to the "first detector" in the present invention, the "second pressure meter 44" corresponds to the "second detector" in the present invention, and the "static mixer 10" corresponds to the "chemical-mixing part" in the present invention.

A scale inhibition agent injection line 11 is connected to the piping L1 upstream relative to the static mixer 10.

A chelating agent injection line 23 extending from a chelating agent storage tank 21 via a chelating agent injection pump 22, and an alkaline agent injection line 33 extending from an alkaline agent storage tank 31 via an alkaline agent injection pump 32, are connected to the scale inhibition agent injection line 11, which is configured so that the chelating agent and the alkaline agent can be injected simultaneously or alternately.

There are no particular limitations with regards to the chelating agent stored in the chelating agent storage tank 21. A chelating agent is a compound having a plurality of functional groups such as carboxyl groups and amino groups that form a coordination bond with metal ions. A chelating agent forms a complex with metal ions and inactivates metal ions. Specific examples that can be used include ethylene diamine tetra-acetic acid (EDTA), nitrilotriacetic acid (NTA), 3-hydroxy-2,2'-iminodisuccinic acid (HIDS), carboxymethyl ethylene imine, citric acid, and tartaric acid, as well as aqueous solutions of sodium salts, potassium salts, ammonium salts, hydrates, and the like of the above-mentioned substances. In particular, an agent such as EDTA capable of inactivating calcium ions is preferably used. The chelating agent may be diluted in advance using a dilution solvent. The dilution ratio varies according to factors such as the type of chelating agent, and no particular limitations therefore exist; however, performing dilution so that the concentration of the chelating agent is 0.1 to 10 mass % is preferred, and a concentration of 0.1 to 2.5 mass % is further preferred. Using the chelating agent in a diluted form increases the flow rate of the chemical and results in the chelating agent mixing more readily with hot water. No particular limitations exist with regards to the dilution solvent; any dilution solvent can be used as long as the solvent dissolves the chelating agent and is compatible with the fluid (geothermal water in the present embodiment). Examples include groundwater, river water, geothermal water, steam condensate, cooling tower water, and tap water.

The amount of the chelating agent fed for normal operation is preferably set so that at least the concentration of calcium ions that have not been captured by the chelating agent in the geothermal water on the downstream side of the static mixer 10 is less than the saturation concentration of calcium silicate hydrate at the temperature of the geothermal water that has passed through the heat exchanger 4 (i.e., the value measured by the thermometer 46). Setting the amount of the chelating agent fed as described inhibits deposition of the calcium silicate hydrate downstream of the static mixer 10. The concentration of calcium ions that have not been captured by the chelating agent in the geothermal water on the downstream side of the static mixer 10 can be calculated from the measurement by the calcium ion concentration meter 42 and the amount of the chelating agent fed. Since excessive feeding of the chelating agent during normal operation is not economical, the upper limit value is preferably set so that the concentration of calcium ions that have not been captured by the chelating agent in the geothermal water on the downstream side of the static mixer 10 is preferably 70 to 100% of the saturation concentration of calcium silicate hydrate at the temperature of the geothermal water that has passed through the heat exchanger 4, and a figure of 80 to 90% is further preferable.

No particular limitations exist with regards to the alkaline agent stored in the alkaline agent storage tank 31. It is possible to use an aqueous solution having, as a solute, one or more of the group consisting of sodium hydroxide, potassium hydroxide, sodium carbonate, sodium hydrogen carbonate, potassium hydrogen carbonate, sodium acetate, potassium acetate, ammonia, and organic amines. The alkaline agent may be diluted in advance using a dilution solvent. The dilution ratio varies according to factors such as the type of alkaline agent, and no particular limitations therefore exist; however, performing dilution so that the concentration of the alkaline agent is 1 to 40 mass % is preferred, and a concentration of 1 to 15 mass % is further preferred. When a high-concentration alkaline agent is fed, the pH in the vicinity of the inlet increases locally, and calcium silicate hydrate and other scale are deposited out more readily. However, diluting the alkaline agent in advance makes it possible to inhibit deposition of scale in the vicinity of the inlet. No particular limitations exist with regards to the dilution solvent; any dilution solvent can be used as long as the solvent dissolves the alkaline agent and is compatible with the fluid (geothermal water in the present embodiment). Examples include groundwater, river water, geothermal water, steam condensate, cooling tower water, and tap water.

The amount of the alkaline agent fed is preferably set so as to result in a pH at which the saturation concentration of amorphous silica at the temperature of the geothermal water that has passed through the heat exchanger 4 is equal to or greater than the concentration of silica in the geothermal water. Setting the amount of the alkaline agent fed as described makes it possible to inhibit deposition of silica scale.

Figure 2:
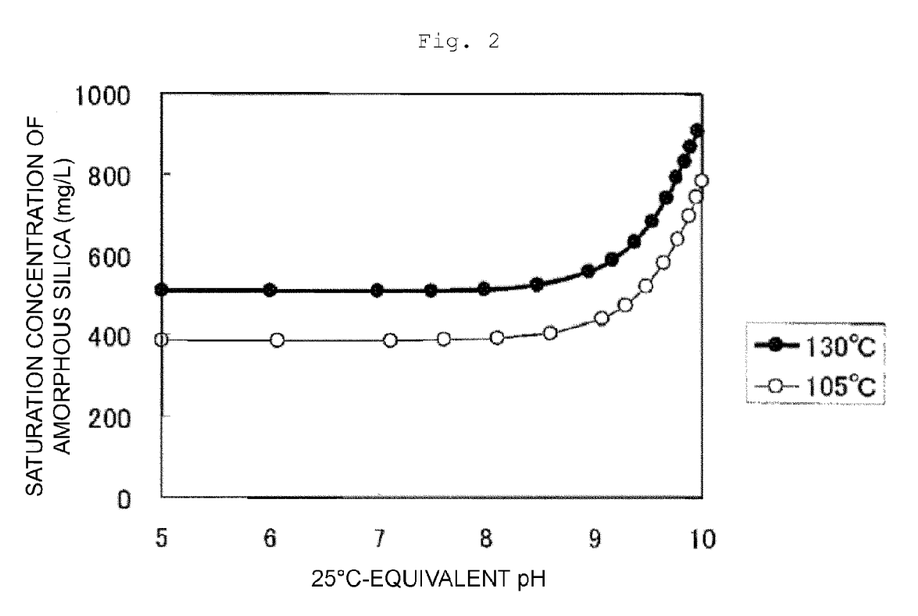
FIG. 2 shows the relationship between 25° C.-equivalent pH of the geothermal water and saturation concentration of amorphous silica at different temperatures.

FIG. 2 shows the relationship between 25° C.-equivalent pH of the geothermal water at different temperatures and saturation concentration of amorphous silica. If the temperature of the geothermal water at the outlet of the production well is 130° C. and the dissolved silica concentration is 600 mg/L, and the temperature of the geothermal water that has passed through the heat exchanger 4 (i.e., the value measured by the thermometer 46) is 105° C., the 25° C.-equivalent pH at which the saturation concentration of amorphous silica at 105° C. is 600 mg/L is 9.7. Accordingly, in such an instance, setting the amount of the alkaline agent fed so that the value measured by the pH meter 45 is equal to or greater than 9.7 makes it possible to have the saturation concentration of amorphous silica at the temperature of the geothermal water that has passed through the heat exchanger 4 be equal to or greater than the concentration of silica in the geothermal water.

Piping L1 channeling the geothermal water, and piping L2 channeling a heat medium having a low boiling point (hereafter referred to as the "low-boiling-point medium"), are connected to the heat exchanger 4. Piping L3 equipped with the thermometer 46 thereon extends from the heat exchanger 4 and connects to an reinjection well 5.

The geothermal water, having flowed into the heat exchanger 4, exchanges heat with the low-boiling-point medium and causes the low-boiling-point medium to evaporate, and is then returned through the piping L3 to the reinjection well 5.

The low-boiling-point medium vaporized in the heat exchanger 4 by the heat exchange with the geothermal water is sent to a turbine 6, and power is generated by a generator 7. The low-boiling-point medium, having passed through the turbine 6, is sent to a medium condenser 8 where turned into a condensate, pressurized using a centrifugal pump 9, and returned to the heat exchanger 4.

A substance capable of vaporizing using heat from the geothermal water is preferably used as the low-boiling-point medium. Examples of the medium preferably used include n-heptane, isoheptane, n-pentane, isopentane, n-butane, isobutane, hydrofluoroether, refrigerant R245fa, refrigerant R134a, refrigerant R22, and refrigerant R407c.

In this geothermal power generation device, the chelating agent and the alkaline agent are fed to the piping L1 from the scale inhibition agent injection line 11, and passing through the static mixer 10, whereby the geothermal water, the alkaline agent, and the chelating agent are mixed, making it possible to inhibit deposition of scale containing calcium ions and silica such as amorphous silica, calcium carbonate, and calcium silicate hydrate downstream of the static mixer 10.

However, when the alkaline agent is fed to the piping L1, the pH of the geothermal water is locally increased in the vicinity of the part at which the scale inhibition agent injection line 11 is connected. Therefore, calcium silicate hydrate is more likely to be deposited out, and calcium silicate hydrate may be deposited out before the geothermal water has passed through the static mixer 10. Feeding an excessively large amount of the chelating agent will make it possible to inhibit the deposition of calcium silicate hydrate, but is not economical because chelating agents are costly agents.

Therefore, in the present invention, allowance is made for deposition of the calcium silicate hydrate in the static mixer 10, and when the amount of calcium silicate hydrate which has been deposited out exceeds a threshold, the amount of chelating agent injected is increased, and the calcium silicate hydrate which has been deposited out in the static mixer 10 is cleaned by dissolution.

Figure 3:
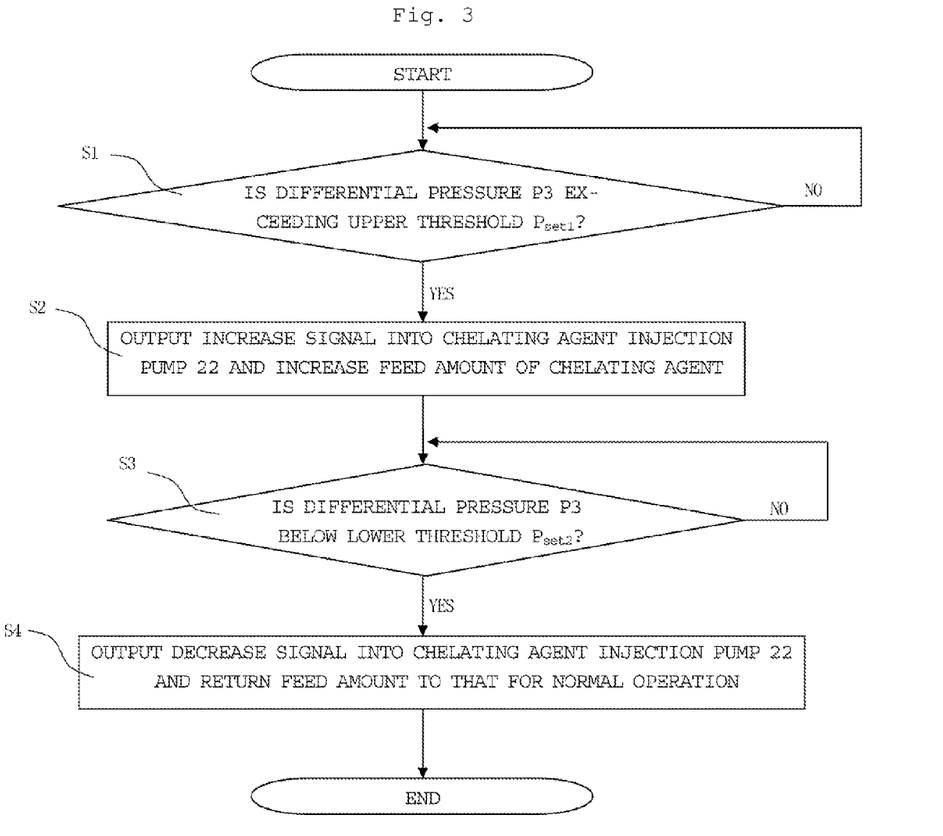
FIG. 3 is a flow chart showing control of the amount of the chelating agent fed in the geothermal power generation device.

Control of the amount of the chelating agent fed according to the present embodiment will now be described using the flow chart in FIG. 3.

First, it is determined whether or not the difference between the value P2 measured by the second pressure meter 44 provided downstream of the static mixer 10 and the value P1 measured by the first pressure meter 43 provided upstream of the static mixer 10 (i.e., P1−P2=differential pressure P3) exceeds an upper threshold $P_{set1}$ (step S1).

If the differential pressure P3 is less than upper threshold $P_{set1}$, the chelating agent is fed at the feed amount for normal operation. When the differential pressure P3 reaches or exceeds the upper threshold $P_{set1}$, an output increase signal is inputted into the chelating agent injection pump 22, and the amount of the chelating agent fed is increased (step S2).

Then, it is determined whether or not the differential pressure P3 is below a lower threshold $P_{set2}$ (step S3). If the differential pressure P3 is equal to or greater than the lower threshold $P_{set2}$, the chelating agent is kept being fed at an increased feed amount. Once the differential pressure P3 falls below the lower threshold $P_{set2}$, an output decrease signal is inputted into the chelating agent injection pump 22, and the feed amount is returned to that for normal operation (step S4).

The amount of the chelating agent fed during normal operation need only be the minimum necessary, and the amount of the chelating agent fed is intermittently increased and the deposited scale is cleaned by dissolution only during periods of heightened scale deposition, therefore making it possible to reduce the amount of chelating agent and operate the geothermal power generation device economically while inhibiting scale.

The upper threshold $P_{set1}$ and the lower threshold $P_{set2}$ can be set, as appropriate, within a range in which the flow of the geothermal water is not disrupted, upon prior investigation of the relationship between the differential pressure P3 and the amount of deposition of scale including calcium silicate hydrate.

With regards to the amount of the chelating agent fed during cleaning of the scale by dissolution, the relationship between the amount of deposition of scale including calcium silicate hydrate and the amount of the chelating agent capable of dissolving the amount of deposition of scale is investigated in advance, and the feed amount is increased to a level capable of cleaning the deposited scale by dissolution. Although there is a variation according to the type of the chelating agent and the scale deposition amount, as one specific example, in an instance in which EDTA is used as the chelating agent, when the differential pressure P3 exceeds 20 kPa, feeding the chelating agent for 10 to 12 hours at a feed amount equivalent to eight to ten times that for normal operation makes it possible to clean the scale by dissolution.

Second Embodiment

Figure 4:
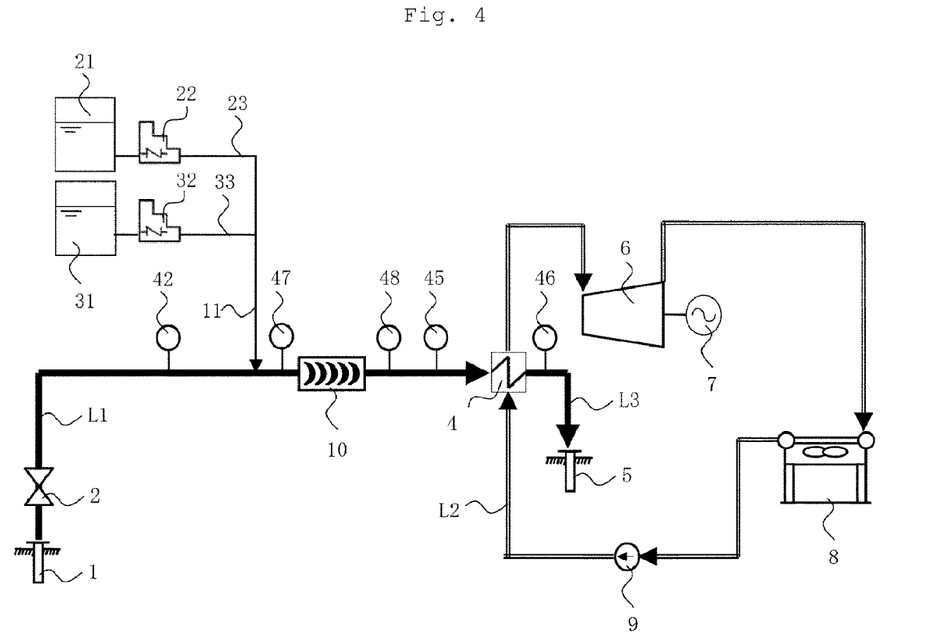
FIG. 4 is a schematic view of a second embodiment of the geothermal power generation device to which the scale inhibition method of the present invention is applied.

A second embodiment of the geothermal power generation device to which the scale inhibition method of the present invention is applied will now be described with reference to FIG. 4. Elements that are substantively identical to those in the first embodiment are affixed with identical numerals and a description will not be provided.

The present embodiment differs from the first embodiment in that a first flow rate meter 47 and a second flow rate meter 48 are provided instead of the first pressure meter 43 and the second pressure meter 44. In the present embodiment, the "first flow rate meter 47" corresponds to the "first detector" in the present invention, and the "second flow rate meter 48" corresponds to the "second detector" in the present invention.

In the present embodiment, control is performed so that when the difference in flow rates between the upstream side and the downstream side of the static mixer 10 exceeds an upper threshold, the amount of chelating agent injected is increased, and the calcium silicate hydrate which had been deposited out in the static mixer 10 is cleaned by dissolution.

Figure 5:
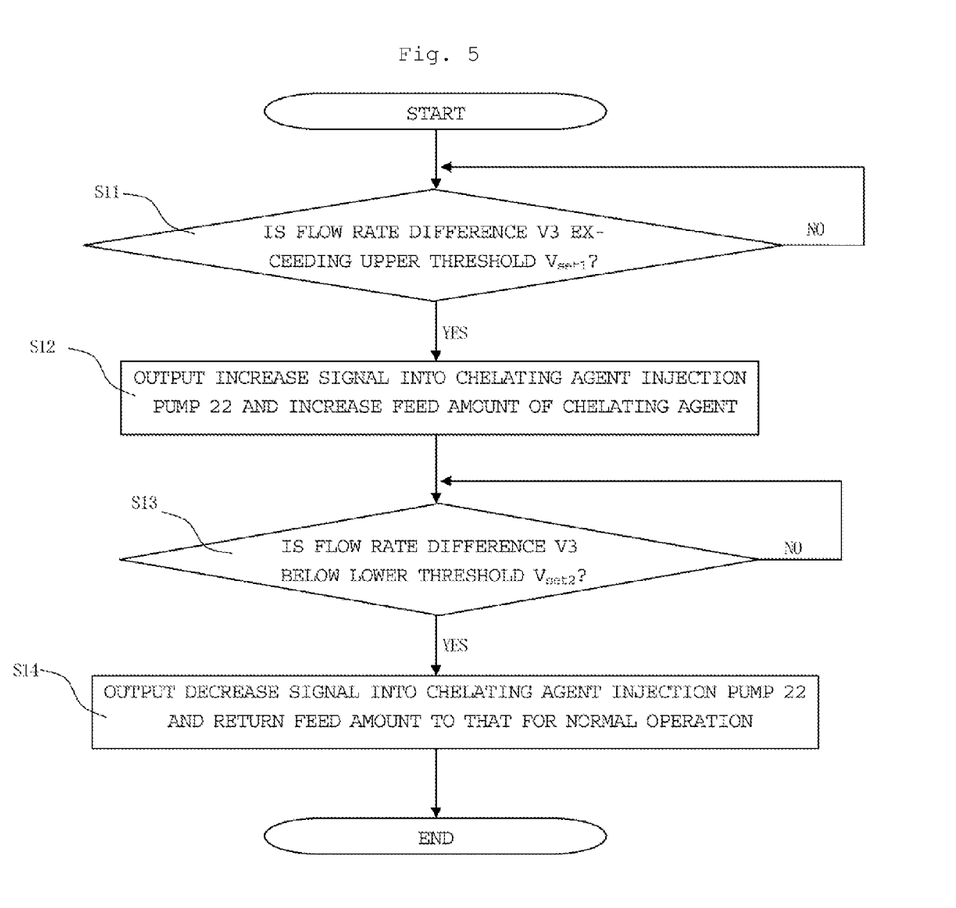
FIG. 5 is a flow chart showing control of the amount of the chelating agent fed in the geothermal power generation device.

Control of the amount of the chelating agent fed in the present embodiment will now be described using the flow chart in FIG. 5.

First, it is determined whether or not the difference between the value V1 measured by the first flow rate meter 47 provided upstream of the static mixer 10 and the value V2 measured by the second flow rate meter 48 provided downstream of the static mixer 10 (i.e., V1−V2=flow rate difference V3) exceeds an upper threshold $V_{set1}$ (step S11).

If the flow rate difference V3 is less than the upper threshold $P_{set1}$, the chelating agent is fed at the feed amount for normal operation. When the flow rate difference V3 reaches or exceeds the upper threshold $P_{set1}$, an output increase signal is inputted into the chelating agent injection pump 22, and the amount of the chelating agent fed is increased (step S12).

Then, it is determined whether or not the flow rate difference V3 is below a lower threshold $V_{set2}$ (step S13). If the flow rate difference V3 is equal to or greater than the lower threshold $P_{set2}$, the chelating agent is kept being fed at an increased feed amount. Once the flow rate difference V3 falls below the lower threshold $P_{set2}$, an output decrease signal is inputted into the chelating agent injection pump 22, and the feed amount is returned to that for normal operation (step S14).

The upper threshold $V_{set1}$ and the lower threshold $V_{set2}$ can be set, as appropriate, within a range in which the flow of the geothermal water is not disrupted, upon prior investigation of the relationship between the flow rate difference V3 and the amount of deposition of scale including calcium silicate hydrate.

EXAMPLES

Test Example 1

Power was generated using the geothermal power generation device shown in FIG. 1. The properties of the geothermal water collected from the production well were as follows: temperature: 130° C.; pH9; calcium ion concentration: 10 mg/L; dissolved silica concentration: 600 mg/L. The temperature of the geothermal water that has passed through the heat exchanger 4 (i.e., the value measured by the thermometer 46) was 105° C. A kettle-type tube-and-shell heat exchanger was used as the heat exchanger 4. The geothermal water was channeled through the tube side of the heat exchanger, and pentane, which is a low-boiling-point medium, was channeled through the shell side of the heat exchanger. The output of the generator 7 was designed so as to be 40 kW per 1 kg/s of pentane and 10 kW per 1 kg/s of the geothermal water.

For the alkaline agent, sodium hydroxide was used; the sodium hydroxide was diluted with water, and an aqueous sodium hydroxide solution having a sodium hydroxide concentration of 14 mass % was prepared. This aqueous sodium hydroxide solution was fed so that the pH of the geothermal water equaled 10.

For the chelating agent, EDTA tetrasodium tetrahydrate salt was used. The EDTA tetrasodium tetrahydrate salt was diluted with water, and a 0.4-mass % aqueous EDTA tetrasodium salt solution was prepared. The amount of the EDTA solution fed for normal operation was set to 1 ml/min. The upper threshold $P_{set1}$ of the differential pressure P3 was set to 20 kPa. When the differential pressure P3 exceeded 20 kPa, the amount of the EDTA solution fed was set to 10 ml/min, the scale was cleaned by dissolution, and the feed amount was returned to that for normal operation after 10 hours.

Figure 6:
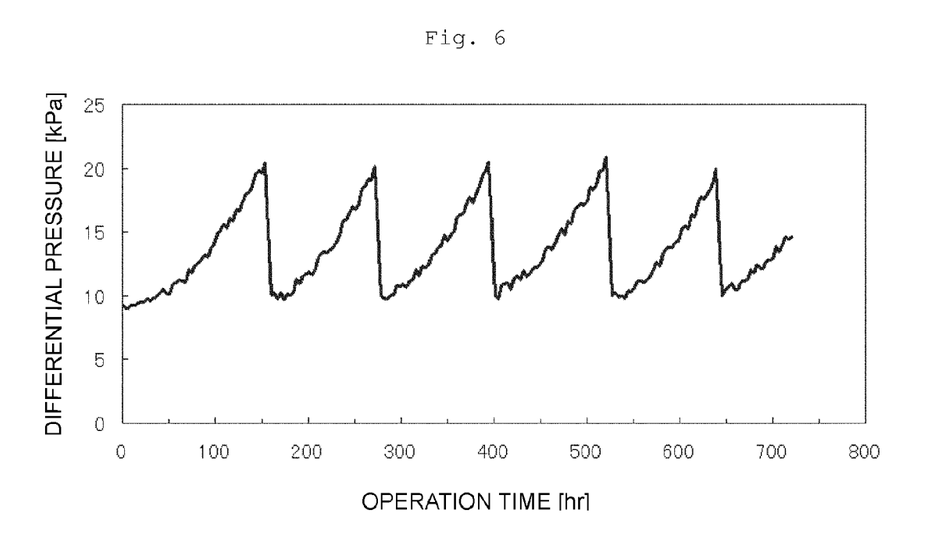
FIG. 6 shows the relationship between the operation time and the differential pressure P3 in test example 1.
Figure 7:
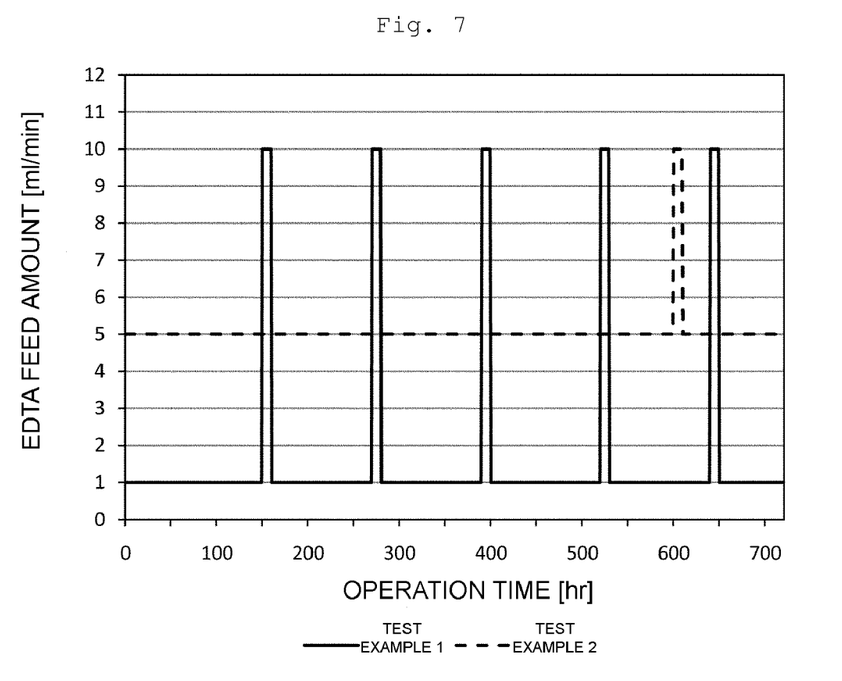
FIG. 7 shows the relationship between the operation time and the amount of the EDTA solution fed in test examples 1 and 2.

The geothermal power generation device was operated for 30 days under the conditions described above. The scale-cleaning operation was performed five times during the operation period. The total amount of the EDTA solution used during the operation period was approximately 70 liters. Although scale deposition occurred in the static mixer 10 during the operation period, increasing the amount of the EDTA solution fed and cleaning the scale when the differential pressure P3 exceeded 20 kPa made it possible to generate power in a stable manner without encountering problems such as piping blockage. Almost no scale deposition occurred downstream of the static mixer 10. The relationship between the operation time and the differential pressure P3 according to test example 1 is shown in FIG. 6, and the relationship between the operation time and the amount of the EDTA solution fed in said test example 1 is shown in FIG. 7.

Test Example 2

The geothermal power generation device was operated for 30 days as with test example 1, except that the amount of the EDTA solution fed for normal operation was set to 5 ml/min. The scale-cleaning operation was performed once during the operation period. The total amount of the EDTA solution used during the operation period was approximately 219 liters.

In test example 2, even though a greater amount of the EDTA solution was fed during normal operation than that for test example 1, scale deposition occurred in the static mixer 10. However, increasing the amount of the EDTA solution fed and cleaning the scale when the differential pressure P3 exceeded 20 kPa made it possible to generate power in a stable manner without encountering problems such as piping blockage.

Figure 8:
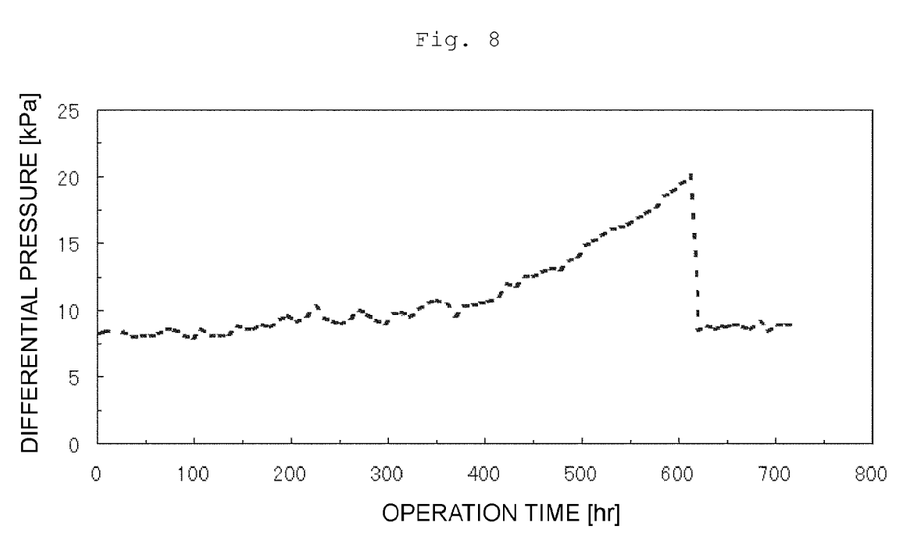
FIG. 8 shows the relationship between the operation time and the differential pressure P3 in test example 2.

However, in test example 2, an excess amount of the EDTA solution was fed during normal operation; as a result, even though only one cleaning operation was required during the operation period, the total amount of the EDTA solution used was at least approximately as three times as that in test example 1. The relationship between the operation time and the differential pressure P3 during the operation period according to test example 2 is shown in FIG. 8, and the relationship between the operation time and the amount of the EDTA solution fed in said test example 2 is shown in FIG. 7.

EXPLANATION OF NUMERALS AND CHARACTERS

1 Production well
2 Flow control valve
4 Heat exchanger
5 Reinjection well
6 Turbine
7 Generator
8 Medium condenser
9 Centrifugal pump
10 Static mixer
11 Scale inhibition agent injection line
21 Chelating agent storage tank
22 Chelating agent injection pump
23 Chelating agent injection line
31 Alkaline agent storage tank
32 Alkaline agent injection pump
33 Alkaline agent injection line
42 Calcium ion concentration meter
43 First pressure meter
44 Second pressure meter
45 pH meter
46 Thermometer
47 First flow rate meter
48 Second flow rate meter
L1-L3 Piping

The invention claimed is:

1. A scale inhibition method for injecting an alkaline agent and a chelating agent into a fluid containing at least silica and calcium ions, and inhibiting generation of scale, the scale inhibition method comprising:
   feeding the chelating agent and the alkaline agent into piping channeling the fluid;
   mixing the fluid while causing the fluid to flow in a chemical-mixing part provided in the piping; and
   when a pressure difference between the pressures at an inlet and an outlet of the chemical-mixing part exceeds a preset upper threshold, increasing the amount of the chelating agent fed, and feeding the chelating agent at an increased feed amount until the pressure difference falls below a preset lower threshold.

2. The scale inhibition method according to claim 1, wherein the alkaline agent is fed to the fluid at the same time as or after the feeding of the chelating agent.

3. The scale inhibition method according to claim 1, wherein the chemical-mixing part is a static mixer.

4. The scale inhibition method according to claim 1, wherein:
the method includes a step in which the fluid is geothermal water collected from a production well, and geothermal heat is collected from the geothermal water using a geothermal heat recovery apparatus;
the amount of alkaline agent fed is set so as to obtain a pH value at which the saturation concentration of amorphous silica at the temperature of the geothermal water that has passed through the geothermal heat recovery apparatus is equal to or greater than the concentration of silica in the geothermal water; and
the amount of chelating agent fed is set so that the concentration of calcium ions that have not been captured by the chelating agent in the geothermal water on the downstream side of the chemical-mixing part is less than the saturation concentration of calcium silicate hydrate at the temperature of the geothermal water that has passed through the geothermal heat recovery apparatus.

5. The scale inhibition method according to claim 1, wherein at least one of the alkaline agent and the chelating agent is diluted in advance using a dilution solvent and fed to the fluid.

6. A scale inhibition method for injecting an alkaline agent and a chelating agent into a fluid containing at least silica and calcium ions, and inhibiting generation of scale, the scale inhibition method comprising:
feeding the chelating agent and the alkaline agent into piping channeling the fluid;
mixing the fluid while causing the fluid to flow in a chemical-mixing part provided in the piping; and
when a flow rate difference between the rates of fluid flow at an inlet side and an outlet side of the chemical-mixing part exceeds a preset upper threshold, increasing the amount of the chelating agent fed, and feeding the chelating agent at an increased feed amount until the flow rate difference falls below a preset lower threshold.

7. The scale inhibition method according to claim 6, wherein the alkaline agent is fed to the fluid at the same time as or after the feeding of the chelating agent.

8. The scale inhibition method according to claim 6, wherein the chemical-mixing part is a static mixer.

9. The scale inhibition method according to claim 6, wherein:
the method includes a step in which the fluid is geothermal water collected from a production well, and geothermal heat is collected from the geothermal water using a geothermal heat recovery apparatus;
the amount of alkaline agent fed is set so as to obtain a pH value at which the saturation concentration of amorphous silica at the temperature of the geothermal water that has passed through the geothermal heat recovery apparatus is equal to or greater than the concentration of silica in the geothermal water; and
the amount of chelating agent fed is set so that the concentration of calcium ions that have not been captured by the chelating agent in the geothermal water on the downstream side of the chemical-mixing part is less than the saturation concentration of calcium silicate hydrate at the temperature of the geothermal water that has passed through the geothermal heat recovery apparatus.

10. The scale inhibition method according to claim 6, wherein at least one of the alkaline agent and the chelating agent is diluted in advance using a dilution solvent and fed to the fluid.

11. A geothermal power generation device comprising:
piping that channels geothermal water collected from a production well;
a chelating agent feed unit for feeding a chelating agent to the geothermal water flowing through the piping;
an alkaline agent feed unit for feeding an alkaline agent to the geothermal water flowing through the piping;
a chemical-mixing part provided, on the piping route, downstream from the chelating agent feed unit and the alkaline agent feed unit;
a first detector for measuring the pressure at an inlet of the chemical-mixing part; and
a second detector for measuring the pressure at an outlet of the chemical-mixing part;
the chelating agent feed unit being controlled so that when the difference between a detection value by the first detector and a detection value by the second detector exceeds a preset upper threshold, the amount of the chelating agent fed is increased, and the chelating agent is fed at an increased feed amount until the difference between the detection values falls below a preset lower threshold.

* * * * *